United States Patent

Terada

Patent Number: 5,572,103
Date of Patent: Nov. 5, 1996

[54] ROBOT TEACHING PROGRAM CORRECTION METHOD

[75] Inventor: Tomoyuki Terada, Yamanashi, Japan

[73] Assignee: Fanuc, Ltd., Minamitsuru-gun, Japan

[21] Appl. No.: 428,221

[22] PCT Filed: Sep. 12, 1994

[86] PCT No.: PCT/JP94/01509

§ 371 Date: May 2, 1995

§ 102(e) Date: May 2, 1995

[87] PCT Pub. No.: WO95/08143

PCT Pub. Date: Mar. 23, 1995

[30] Foreign Application Priority Data

Sep. 14, 1993 [JP] Japan .................... 4-250985

[51] Int. Cl.$^6$ .................................................. G05B 19/42
[52] U.S. Cl. ............... 318/568.13; 318/573; 318/568.11; 318/571; 901/3; 901/42
[58] Field of Search ....................... 318/560–646; 219/121.64, 124.34; 901/3.42; 395/80–95

[56] References Cited

U.S. PATENT DOCUMENTS

| | | | |
|---|---|---|---|
| 4,541,060 | 9/1985 | Kogawa | 318/573 |
| 4,550,383 | 10/1985 | Sugimoto | 318/573 |
| 4,590,577 | 5/1986 | Nio et al. | 901/42 |
| 4,683,543 | 7/1987 | Hirasawa et al. | 318/573 |
| 4,685,067 | 8/1987 | French et al. | 318/568 |
| 4,689,756 | 8/1987 | Koyama et al. | 318/573 |
| 4,742,207 | 5/1988 | Nakashima | 901/42 |
| 4,835,710 | 5/1989 | Schnelle et al. | 901/3 |
| 5,006,999 | 4/1991 | Kuno et al. | 219/124.34 |
| 5,053,976 | 10/1991 | Nose et al. | 901/3 |
| 5,327,058 | 7/1994 | Rembutsu | 318/568.11 |
| 5,380,978 | 1/1995 | Pryor | 219/121.64 |
| 5,451,850 | 9/1995 | Karakama | 318/568 |

FOREIGN PATENT DOCUMENTS

| | | |
|---|---|---|
| 60-151711 | 8/1985 | Japan . |
| 61-270090 | 11/1986 | Japan . |
| 1-159186 | 6/1989 | Japan . |

*Primary Examiner*—Paul Ip
*Attorney, Agent, or Firm*—Staas & Halsey

[57] ABSTRACT

An industrial-robot teaching program is prepared off-line without using a robot. Then, cameras serving as vision sensors are mounted on a wrist flange of the robot to obtain measured position data for a teaching point P1. The teaching point P1 is on a workpiece in a sensor coordinate system and is detected by the vision sensor. The position data for the teaching point in the teaching program is converted into position data in the sensor coordinate system. Next, an error of the robot wrist flange coordinate system is estimated in accordance with a difference between measured position data for the teaching point and converted position data in the teaching program. Then, the teaching point data included in the teaching program is corrected based on the estimated error of the robot wrist flange coordinate system. The vision sensor may also be attached to an end effector of the robot.

6 Claims, 3 Drawing Sheets

ROBOT TEACHING PROGRAM CORRECTION METHOD

BACKGROUND OF THE INVENTION

1. Field of the Invention

The present invention relates to a method for correcting, using a vision sensor, an already-prepared robot teaching program, that is, a robot teaching program in which teaching point data has already been specified. More particularly, the present invention relates to a teaching program correction method for removing the deviation between a teaching point position specified by a teaching program and a position corresponding to the teaching point on an actual work object. Though the method of the present invention can be applied to industrial robots in general, the application to a welding robot for performing arc welding or spot welding may be considered as a typical application.

2. Description of the Prior Art

To rationalize the preparation process of the robot teaching program designed for various work, including welding work to be carried out by moving a robot with respect to a work object (hereinafter referred to as a workpiece), an off-line programming system has been employed. Data for designing a workpiece, data relating to the positional relation between a robot and the workpiece, and data giving the relation between coordinate systems set for the robot (homogeneous transformation matrix data) are used to prepare a teaching program on an off-line basis. Therefore, an actual robot position (including its posture; the same applies hereafter) under a reproductive operation may deviate from a position specified or prearranged as a teaching point on an actual workpiece due to various error factors.

More particularly, it commonly happens that the actual position of robot, corresponding to the position taught by the teaching program when the program is executed, does not always coincide with the position specified as an n-th position on the actual workpiece. The following are error factors which are considered to cause positional deviation of taught positions.

1. Errors of data relating to the positional relation between a robot and a workpiece: In other words, the positional relation between the robot and the workpiece according to the data is not realized;
2. Machining and assembling errors of a robot (e. g. link length error);
3. Errors due to deflection of a robot caused by its own weight or the weight of an end effector;
4. Machining and assembling errors of an end effector;
5. Errors due to deflection of an end effector
6. Shape errors of a workpiece.

It has been difficult to prepare an off-line program by previously evaluating accurately these errors. In particular, it has been almost impossible to previously evaluate the above factors 4 to 6.

Thus, the deviation between a position to be realized corresponding to a teaching point under reproduction of a program and a teaching point position specified for an actual workpiece typically occurs when the program was prepared on an off-line basis. However, the occurrence of such deviation is not necessarily limited to the case of an off-line program but may also occur in any prepared program into which the above error factors may come. For example, when workpiece manufacturing lot numbers are changed, the above factor 6 works. When end effectors are changed, the above factors 3 to 5 work. Therefore, the aforementioned deviation from teaching point may occur in a teaching program which was prepared into any optional system.

Conventionally, however, when the above-described problem is encountered or expected to be encountered, it has been a usual practice that the robot equipped with an end effector is manually operated to let its tool point coincide with each point on a workpiece (a representative workpiece) which is actually taught to the robot (by the program). However, the above manual program correction by an operator requires a large workload. In particular, when types of workpieces are diversified and thereby the number of programs to be prepared and used increases, the program correction causes the productivity of the entire robot operation to greatly decrease.

SUMMARY OF THE INVENTION

An object of the present invention is to solve the above problems of the prior art by providing a robot teaching program correction method capable of efficiently executing program data correction in order to prevent the above teaching point deviation, which occurs in a prepared teaching program. Moreover, another object of the present invention is to improve the usefulness of a program prepared by an off-line programming system by providing the above teaching program correction method.

To achieve the above objects, the present invention includes the step of putting a mark which can be identified by a vision sensor on a point of a workpiece corresponding to at least one teaching point selected out of the teaching points provided with position data on a prepared teaching program, the step of measuring the position of the mark by the vision sensor mounted on a robot while keeping the robot at the selected teaching point position, the step of determining necessary correction amounts of the position data for all or some teaching points in the teaching program in accordance with the mark position measurement result, and the step of executing the position data correction corresponding to the necessary correction amounts.

Since the present invention has the above constitution, teaching-data correction for compensating errors due to various factors, which are hard to be measured, included in a robot teaching program prepared by an off-line programming system is executed according to a simple procedure by using a vision sensor. Therefore, when the teaching program corrected in accordance with the present invention is executed, a robot track is realized, which is compensated for all or substantial portions of (1) the errors of the data showing the positional relation between a robot and a workpiece, (2) the machining and assembling errors of a robot, (3) the errors due to deflection of a robot caused by its own weight or the weight of an end effector, (4) the machining and assembling errors of an end effector, (5) the errors due to deflection of an end effector, and (6) the shape errors of a workpiece. As a result, it becomes possible to omit a teaching-program data correction work which has been performed by complicated manual operation requiring skill and also to improve the reliability of the program data accuracy.

DESCRIPTION OF THE PREFERRED EMBODIMENTS

Figure 1:
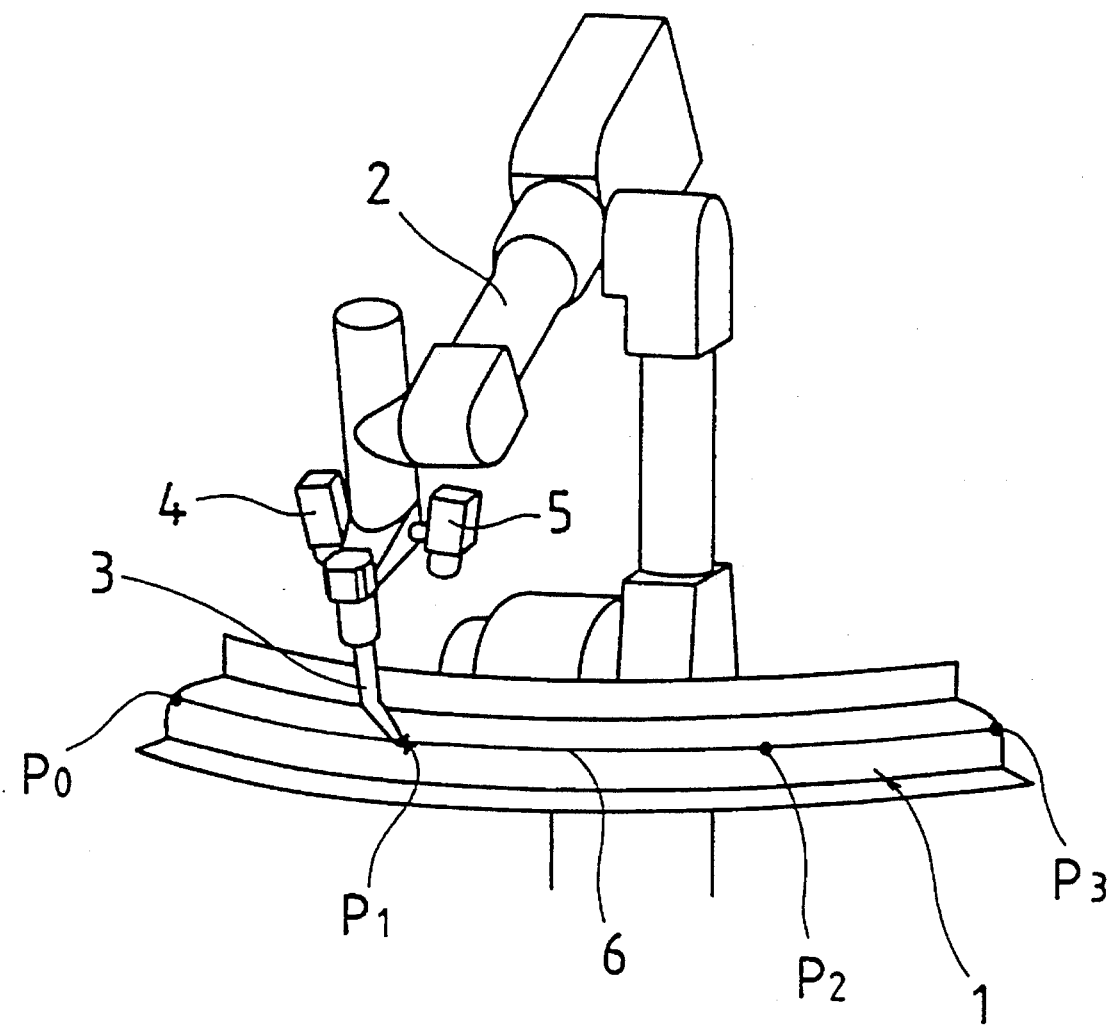
FIG. 1 is a typical view showing the state of teaching point position measurement when applying the correction method of the present invention to a teaching program for welding work.
Figure 2:
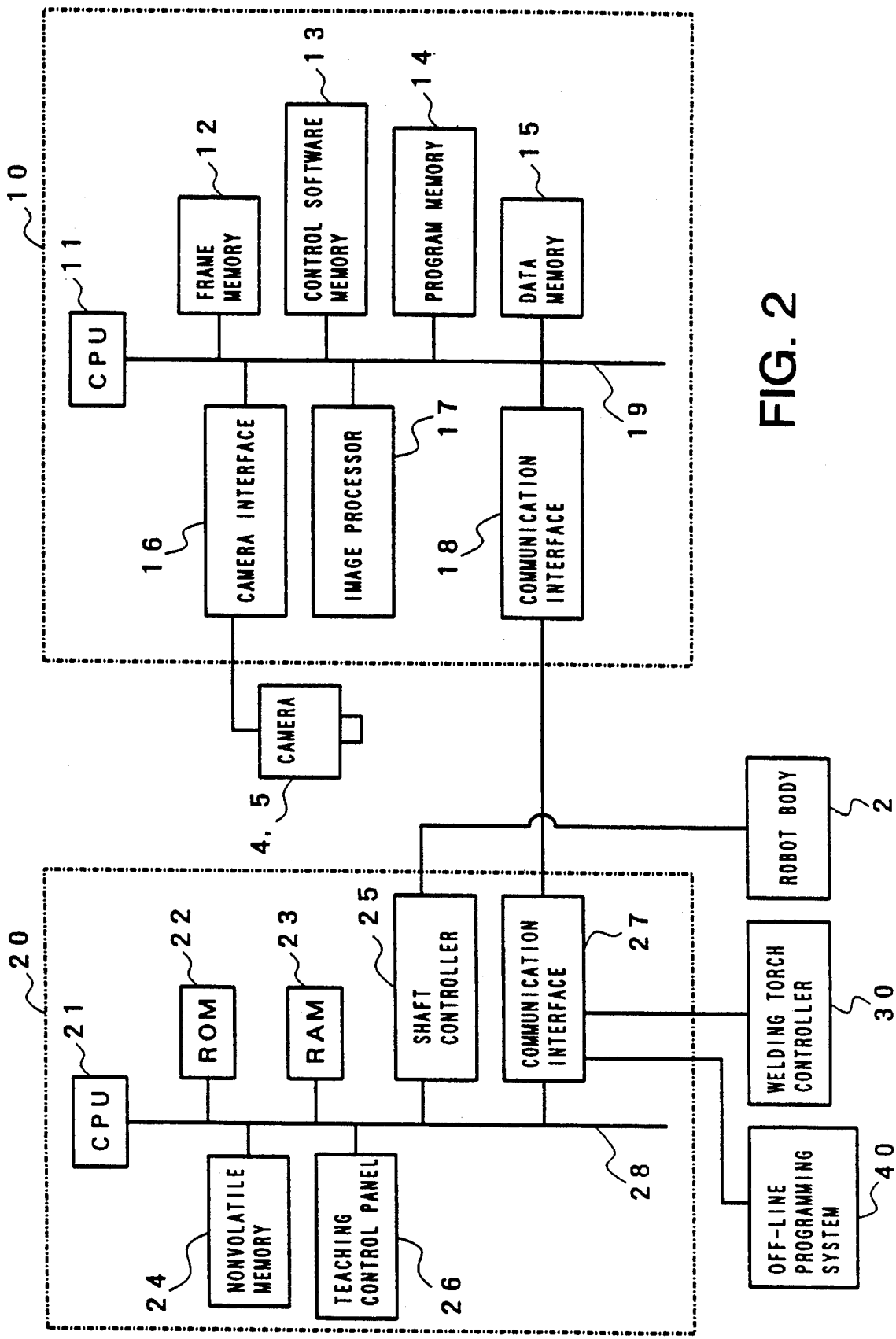
FIG. 2 is a block diagram of main portions showing the outline of a system constitution used to execute the method of the present invention.
Figure 3:
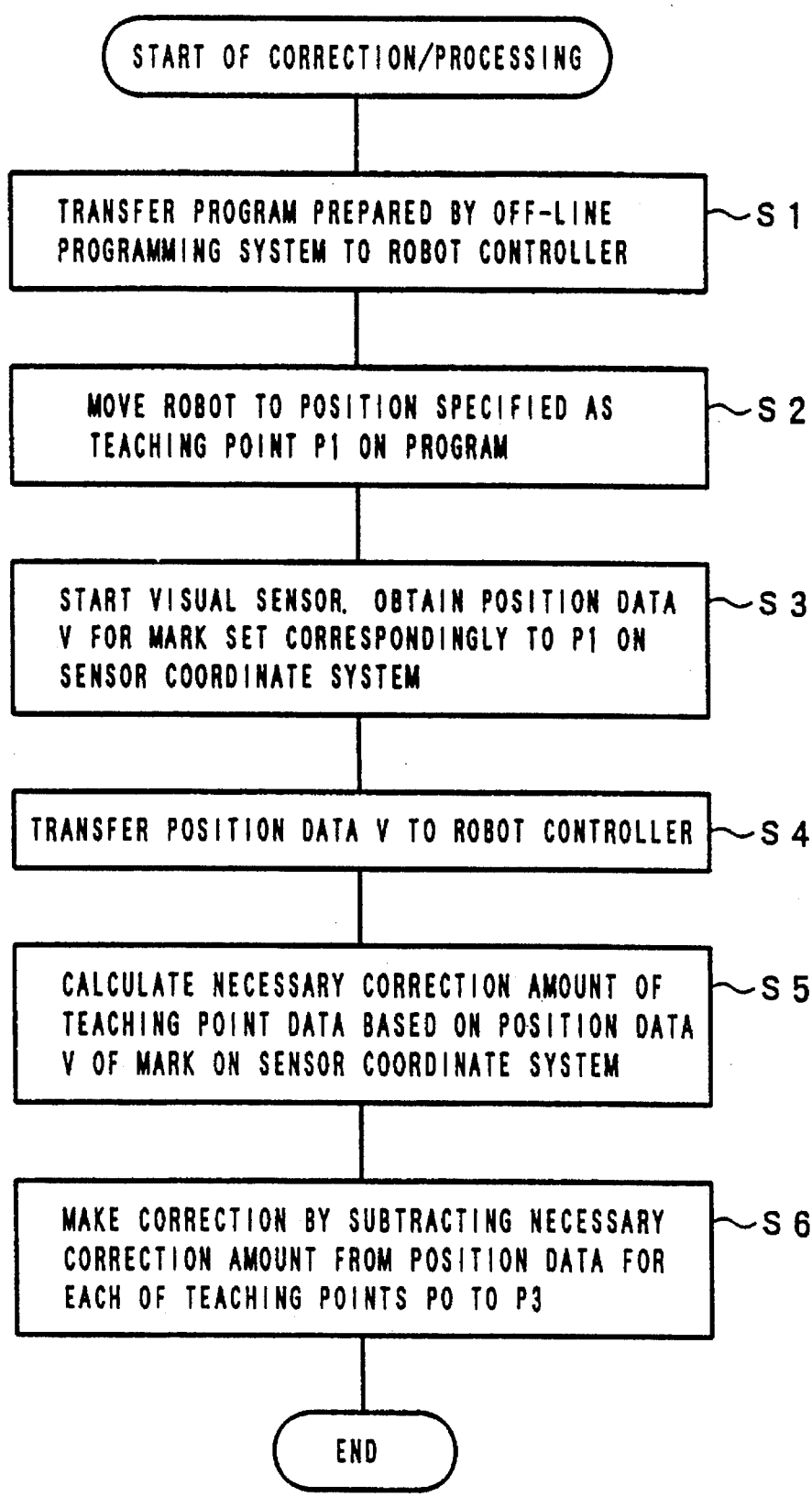
FIG. 3 is a flow chart showing the outline of an operation/processing procedure for executing the teaching program correction method of the present invention for the case shown in FIG. 1 using the system shown in FIG. 2.

FIG. 1 is a typical perspective view showing the state of teaching point position measurement when applying the correction method of the present invention to a teaching program for welding. FIG. 2 is a block diagram of main portions showing the outline of a system constitution used to execute the method of the present invention.

In FIG. 1, reference numeral 1 represents a workpiece for teaching point position measurement fixed in a work space by a fixing means not illustrated, which has a weld line 6. A workpiece is selected, as a workpiece for teaching point position measurement, from a large number of similar type workpieces with the same size each having a weld line at the same position. Reference numeral 2 represents a robot body whose wrist flange portion is provided with a welding torch 3 and two cameras 4 constituting a three-dimensional vision sensor.

Symbols P0 to P3 represent teaching points set along the weld line 6. A teaching program prepared on a off-line basis is provided with teaching point data (generally including errors) showing the positions of these teaching points.

In the case of the present embodiment, the teaching point P1 is selected as a typical teaching point and the mark "+" is put on a portion of a workpiece corresponding to the teaching point P1. Such a mark can be of any shape as long as it can be recognized by a vision sensor. Thus, the mark can be formed by writing with ink or by attaching a seal. Moreover, it is also possible to use a characteristic point peculiar to a workpiece as a mark. In FIG. 1, a state is illustrated in which the mark "+" is picked up by the cameras 4 and 5 while the robot is positioned at a robot position specified as the position of the teaching point P1 by a teaching program. If program data is in a state not requiring correction, the position of the tool tip set for the robot must precisely coincide with the mark position. In general, however, the both will not coincide with each other due to various error factors. That is, the program data requires correction.

Referring to FIG. 2, the system comprises a robot body 2, cameras 4 and 5 (two cameras), an image processor 10, a robot controller 20, a welding torch controller 30, and an off-line programming system 40.

The image processor 10 is provided with a central processing unit (hereinafter referred to as a CPU) 11. The CPU 11 is connected to a frame memory (image memory) 12, a control software memory 13 comprising a ROM, a program memory 14 comprising a RAM or the like, a data memory 15 comprising a nonvolatile RAM, a camera interface 16, an image processor 17, and a communication interface 18 through a bus 19.

The camera interface 16 is connected to the cameras 4 and 5. Image signals output from the two cameras 4 and 5 are input in order when the CPU 11 specifies a connector number in the camera interface 16. The communication interface 18 is connected to a communication interface 27 on the side of robot controller 20, and signals representing commands or data are transmitted or received through these interfaces.

Images picked up in the fields of view of the cameras 4 and 5 are converted into shaded images according to gray scale and stored in the frame memory 12. The image processor 17 has a function for processing an image stored in the frame memory 12 in accordance with a command outputted from the CPU 11. The control software memory 13 stores a control program for the CPU 11 to control a vision sensor, a calibration program for setting a sensor coordinate system by using a jig, an image analysis program for detecting a weld line position by using the image processor 17, and a program for commanding transmission of measurement data to a robot at a proper time.

It is also possible to connect a TV monitor for visually confirming an image picked up by the camera 30 or an image called out from the frame memory 12 through a monitor interface (not shown).

On the other hand, the robot controller 20 is provided with a central processing unit (CPU) 21. The CPU 21 is connected, through bus 28, to a ROM 22 storing a control program, a RAM 23 used to temporarily store calculation data, a memory 24 comprising a nonvolatile RAM for storing various set values such as teaching data and calibration jig data, a shaft controller 25 (including a servo circuit) for controlling each shaft of the robot body 40, a teaching control panel 26 for manual operation of a robot, coordinate system setting, position teaching, automatic operation (reproductive operation), and communication with an image processor for transferring a sensor start-up command, etc., and the communication interface 27 connected to the communication interface 18 on the side of image processor 10.

The communication interface 27 is also connected to the welding torch controller 30 for turning on/off the welding torch 3 (see FIG. 1) and controlling welding voltage and welding current, and is also connected to the off-line programming system 40. The interface 27 also serves as an input/output unit for the controller 30 and the system 40.

Though the above system constitution and functions are basically the same as a three-dimensional vision sensor of a conventional welding robot, it has the following features for putting the present invention into practice.

<1> A program for obtaining the position data (on the sensor coordinate system) of the teaching point mark shown in FIG. 1 and other necessary data are stored in the control software memory 13 of the image processor 10.

<2> A program for calculating a necessary correction amount for correcting the teaching point data included in a teaching program by using the above obtained position data of the teaching point mark, a program for correcting the position data for each of the teaching points P0 to P3 in accordance with the above calculation result, and related necessary data are stored in the nonvolatile memory 24 of the robot controller 20.

The following is the description of the principle for obtaining a necessary correction amount of the teaching point data included in the teaching program.

Four cases are described below which are assumed by combining the cases in which the cameras 4 and 5 serving as vision sensors are set to the wrist flange of the robot instead of an end effector, the cameras are set to the wrist flange of the robot through the end effector, and moreover a case in which the vision sensor is a three-dimensional sensor, and a case where it is a two-dimensional sensor.

[1] When the cameras 4 and 5 serving as vision sensors are set to the wrist flange of the robot instead of the end effector (welding torch):

First, data showing the positional relation between the sensor coordinate system, of the three- or two-dimensional vision sensor, and the wrists flange coordinate system, showing the position of the wrist flange of the robot, is obtained by a proper calibrating operation. The homogeneous transformation matrix (hereinafter referred to simply as matrix) showing the relative positional relation of the sensor coordinate system to the wrist flange coordinate system is assumed to be C. Though there are several calibration methods, their descriptions are omitted here because they are generally known.

Moreover, it is assumed that the tool tip position with respect to the wrist flange is already set. Furthermore, it is assumed that the matrix showing the relative positional relation of the tool coordinate system to the wrist flange coordinate system is T. Furthermore, it assumed that a matrix R represents a wrist flange position in terms of one workpiece coordinate system fixed in a work space which is calculated based on the teaching program data, the matrix showing an actual (true) wrist flange position is given as R', and a teaching point position is given as P.

[1—1] When the vision sensor system uses a three-dimensional vision sensor:

When it is assumed that a measured position on the sensor coordinate system, in the case where the vision sensor is able to measure the three-dimensional position of a teaching point mark put on a workpiece, is V' and a teaching point position calculated with program data is V, the following expressions are obtained:

$$RCV=P \qquad (1)$$

$$R'CV'=P \qquad (2)$$

When it is assumed that the error of R' to R is only due to a parallel movement component, the following expression (3) holds.

$$R'=R+Er \qquad (3)$$

Where Er is a matrix expressed by the following expression (4).

$$Er = \begin{bmatrix} 0 & 0 & 0 & e_x \\ 0 & 0 & 0 & e_y \\ 0 & 0 & 0 & e_z \\ 0 & 0 & 0 & 0 \end{bmatrix} \qquad (4)$$

The following expression (5) holds in accordance with the above expressions (1) to (4).

$$(R+Er)CV'=RCV \qquad (5)$$

When rearranging the expression (5), the following expression is obtained.

$$ErCV'=RC(V-V') \qquad (6)$$

Thus, the components $e_x$, $e_y$, and $e_z$ of the errors of R' to R on the workpiece coordinate system are obtained in the form of the expression below.

$$\begin{bmatrix} e_x \\ e_y \\ e_z \\ 0 \end{bmatrix} = RC(V-V') \qquad (7)$$

From the above, it is estimated that the error of the wrist flange coordinate system of the robot is RC(V–V') shown by the expression (7). Therefore, it is possible to obtain a teaching program including the teaching point data in which the error in terms of the coordinate system of the wrist flange is compensated by shifting, for each teaching point, teaching point data (on the coordinate system of workpiece) by –RC(V–V') for collection.

Thus, it is possible to improve the coincidence degree between the robot track under reproduction of a program and the teaching line prearranged on the workpiece by absorbing a considerable part of the error factors excluding those related to an end effector.

[1-2] When the vision sensor system uses a two-dimensional vision sensor:

When it is assumed that the measured position of a teaching point mark put on a workpiece, expressed on the sensor coordinate system by the two-dimensional-position-measuring vision sensor, is V' and a teaching point position calculated based on program data, expressed on the sensor coordinate system, is V, the following expressions are obtained similarly to the case of three-dimensional vision sensor.

$$RCV=P \qquad (8)$$

$$R'CV'=P \qquad (9)$$

However, since V' is originally two-dimensional information, it is shown by the following expression (10) including a parameter "t".

$$V' = \begin{bmatrix} u'*t \\ v'*t \\ t \\ 1 \end{bmatrix} \qquad (10)$$

The parameter "t" represents a value corresponding to the distance from the origin to a teaching point on the sensor coordinate system. Therefore, the Z-coordinate value of V is obtained from the above expression (8), "RCV=P" to use the value as the value of "t". The above "u'" and "v'" are values obtained from the two-dimensional vision sensor system. This results in the establishment of a three-dimensional coordinate system having the Z axis coinciding with the optical-axis direction of a visual sense system as the sensor coordinate system for expressing the information obtained from the vision sensor system. Thus, it becomes possible to treat V' as three-dimensional data. Therefore, it becomes possible thereafter to determine the necessary correction amount of teaching point data by the same procedure as the case of the three-dimensional vision sensor system.

[2] When a camera serving as a vision sensor is set to an end effector (welding torch):

It is assumed that the tool tip point position (including its attitude) with respect to the wrist flange is previously set. Moreover, it is assumed that the matrix representing the relative positional relation of the tool coordinate system with respect to the wrist flange coordinate system calculated in accordance with the data assumed by a program is T, and the matrix actually representing the relative positional relation between the both systems is T'.

Moreover, through a proper calibrating operation, data is obtained, which represents the positional relation between the sensor coordinate system of a three- or two-dimensional vision sensor and the tool coordinate system. Furthermore, it is assumed that the matrix representing the relative positional relation of the sensor coordinate system to the tool coordinate system is K. Though there are several calibration methods, their descriptions are omitted here because they are generally known.

Furthermore, it is assumed that the matrix showing the wrist flange position viewed on one workpiece coordinate system fixed in a work space, calculated in accordance with teaching program data, is given as R, the matrix showing an actual (true) wrist flange position is given as R', and a teaching point position is given as P.

[2-1] When the vision sensor system uses a three-dimensional vision sensor:

When it is assumed that a measured position on the sensor coordinate system in the case where the vision sensor is able to measure the three-dimensional position of a teaching point mark put on a workpiece is V' and a teaching point position calculated from program data is V, the following expressions are obtained:

$$RTKV=P \quad (11)$$

$$R'T'KV'=P \quad (12)$$

The above expressions (11) and (12) are obtained by substituting RT and R'T' for R and R' and K for C in the expressions (1) and (2). Therefore, by calculating the following expression (13) instead of the expression RC(V–V') for the calculation of a necessary correction amount in the case of the above [1—1], a necessary correction amount in this case is obtained.

$$RTK(V-V') \quad (13)$$

[2-2] When the vision sensor system uses a two-dimensional vision sensor:

When performing calculation by replacing R and R' with RT and R'T' and C with K as in the case of the above [2-1], it is possible to bring back to the case of the above [1-2].

If it is possible to assume that the vision sensor is mounted in a position where machining errors and deflection of an end effector itself can be reflected, the compensation effect of these errors can also be expected. Moreover, even if the vision sensor is mounted in a position where machining and assembling errors of the end effector or deformation errors due to loads are not reflected (parallel simultaneous setting), the deflection of a robot arm due to the weight of the end effector is reflected on the result of mark position measurement. Therefore, function for compensating the error due to the deflection of the robot arm caused by the weight of the end effector is ensured.

The correction calculation corresponding to each of the previously described cases can be executed in a normal robot controller connected with the vision sensor; however, it is also possible to execute the above corrective calculation by transferring the measurement result obtained by using the vision sensor to an external unit (e.g. off-line programming system) other than the robot controller.

The following is the description of the procedure and processing when applying the teaching program correction method of the present invention to the case shown in FIG. 1 by using the system shown in FIG. 2.

First, a program prepared by the off-line programming system 40 is transferred to the robot controller 20 through the communication interface 27 to store the program in the nonvolatile memory 24 (step S1). Then, the robot is moved to the position specified as the teaching point P1 on the program (step S2).

In this condition, vision sensors (cameras 4 and 5) are started to pick up the image of a mark set correspondingly to the teaching point P1 to obtain the mark position data V' on the sensor coordinate system (step S3). This data is immediately transferred to the robot controller 10 through both communication interfaces 18 and 27 and stored in the nonvolatile memory 24 (step S4).

A necessary correction amount of the teaching point position data on the program is calculated in accordance with the calculation method described above (step S5). Because the case in FIG. 1 assumed here corresponds to the case [2-1], it is possible to obtain a necessary correction amount by calculating the expression (13). Furthermore, since the values of R, T, K, and V are already input to the robot as present data or set data, these data can be used for the calculation of the expression (13).

After the necessary correction amount is calculated, a corrected teaching program can be obtained by subtracting the necessary correction amounts from the position data of each of the teaching points P0 to P3 (step S6).

Most of the error factors 1 to 6 described above are eliminated in accordance with the program correction of this embodiment. That is, it is considered that errors of the robot wrist position include at least some of the following errors: 1. errors of the data showing the positional relation between a robot and a workpiece, 2. machining and assembling errors of a robot, 3. errors due to deflection of a robot caused by its own weight or the weight of an end effector, and 6. shape errors of a workpiece. Therefore, by compensating the errors of the robot wrist position, it is expected that these error factors are compensated to a considerable extent. If it is possible to assume that the cameras 4 and 5 are set to a position where machining errors and deflection of a welding torch (end effector) can be included, the compensation effect of the errors can also be expected.

In the case of the above embodiment, one teaching point is selected as a measuring object and the data for all teaching points including other remaining teaching points are corrected in accordance with the position data for a mark put on the selected teaching point. However, there is no theoretical restriction in selecting a combination of a teaching point to be selected as a measuring object with teaching points whose data are to be corrected in accordance with the selected teaching point. In general, it is possible to calculate a necessary correction amount for each point to be corrected by selecting one or more teaching points which can be considered to typically reflect a common error in accordance with kinds of application or the environment in individual cases and measuring one by one the position of a mark put on corresponding to each selected teaching point. It is a matter of course that correction can be omitted for a teaching point such as an air cut point which does not require a very high accuracy.

What is claimed is:

1. A robot teaching program correction method for controlling a robot having a vision sensor comprising the steps of:

forming a mark which can be identified by the vision sensor on a portion of a workpiece corresponding to at least one teaching point selected from teaching points in a teaching program, wherein each of the teaching points has corresponding position data;

measuring a position of the formed mark by the vision sensor while maintaining the robot at the selected teaching point;

obtaining correction amounts corresponding to the position data for some teaching points in the teaching program in accordance with the measured mark position; and correcting the position data in accordance with the correction amounts.

2. A robot teaching program correction method for controlling a robot comprising the steps of:

(1) preparing an industrial-robot teaching program including a plurality of teaching points and corresponding program position data off-line without using the robot;

(2) obtaining measured position data of one teaching point on a workpiece in a sensor coordinate system by mounting a vision sensor to a wrist flange of the robot and detecting the one teaching point by the vision sensor;

(3) converting program position data for the detected one teaching point in the teaching program into program position data in a sensor coordinate system in accordance with a calibrated positional relation between the sensor coordinate system and a robot wrist flange coordinate system;

(4) estimating an error of the robot wrist flange coordinate system based on a difference between the measured position data for the one teaching point obtained in the above Item (2) and the program position data obtained in the above Item (3); and (5) correcting program teaching point data corresponding to the teaching points included in the teaching program based on the estimated error of the robot wrist flange coordinate system estimated in the above Item (4).

3. A robot teaching program correction method comprising the steps of:

(1) preparing an industrial-robot teaching program including a plurality of teaching points and corresponding program position data off-line without using the robot;

(2) obtaining measured position data for one teaching point on a workpiece in a sensor coordinate system by mounting a vision sensor to an end effector of the robot and detecting the one teaching point by the vision sensor;

(3) converting program position data for the detected one teaching point in the teaching program into program position data in a sensor coordinate system in accordance with a calibrated positional relation between the sensor coordinate system and a tool coordinate system;

(4) estimating an error of the tool coordinate system based on a difference between the measured position data of the one teaching point obtained in the above item (2) and the program position data obtained in the above Item (3); and (5) correcting program teaching point data corresponding to the teaching points included in the teaching program based on the estimated error of the tool coordinate system estimated in the above Item (4).

4. The robot teaching program correction method according to claim 2, wherein the detection of the one teaching point on the workpiece using the vision sensor is performed by forming a mark which can be recognized by the vision sensor on a portion of the workpiece corresponding to one of the teaching points and detecting the mark by the vision sensor.

5. The robot teaching program correction method according to claim 2, wherein the detection of the one teaching point on the workpiece by the vision sensor is performed by detecting a characteristic point inherent to the shape of the workpiece which corresponds to the teaching point by the vision sensor.

6. A method for correcting a robot teaching program which includes a plurality of teaching points comprising the steps of:

forming a mark on a portion of a workpiece;

identifying the formed mark by a robot vision sensor;

selecting a teaching point from the plurality of teaching points in the teaching program corresponding to the identified mark;

measuring a position of the identified mark by the vision sensor; and correcting a portion of said plurality of teaching points by calculating a difference between the selected teaching point and the measured position of the identified mark.

* * * * *